B. E. ROCKHOFF.
RIM FOR SEAT SPRINGS.
APPLICATION FILED FEB. 11, 1916.

1,205,567.

Patented Nov. 21, 1916.

INVENTOR
Bert E. Rockhoff
BY Ralzemond A. Parker
ATTORNEY

UNITED STATES PATENT OFFICE.

BERT E. ROCKHOFF, OF DETROIT, MICHIGAN, ASSIGNOR TO LEONARD A. YOUNG, OF HIGHLAND PARK, MICHIGAN.

RIM FOR SEAT-SPRINGS.

1,205,567.  Specification of Letters Patent.  Patented Nov. 21, 1916.

Application filed February 11, 1916. Serial No. 77,771.

*To all whom it may concern:*

Be it known that I, BERT E. ROCKHOFF, a citizen of the United States, residing at Detroit, county of Wayne, State of Michigan, have invented a certain new and useful Improvement in Rims for Seat-Springs, and declare the following to be a full, clear, and exact description of the same, such as will enable others skilled in the art to which it pertains to make and use the same, reference being had to the accompanying drawings, which form a part of this specification.

This invention relates to rims for seat springs, and rims especially designed for an automobile seat spring. The use of wooden frames for automobile seat springs has been largely supplanted by the use of metal frames which are lighter and more in accordance with the present practice of wholly doing away with the use of wood in connection with automobiles.

The invention hereinafter to be described consists of a seat spring rim which has the adaptability of both holding the helical springs and securing the bottom edge of the upholstering facing. A seat spring rim to accomplish these two functions is not broadly new. Such a rim strip is shown in Patent #1,058,285 granted April 8, 1913, to Leonard A. Young. My rim strip is intended as an improvement over the rim strip shown in the Young patent, and the nature of such an improvement can better be described after the invention in detail is disclosed.

Figure 3:
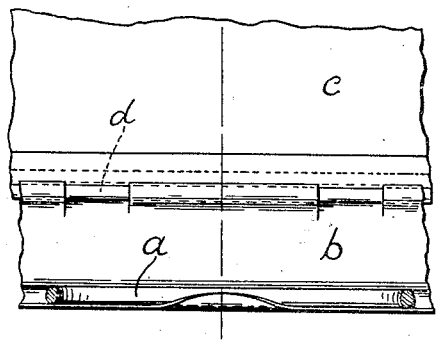
Figures 4, 5:
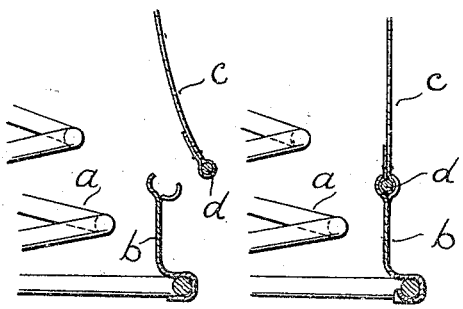
Figure 1:
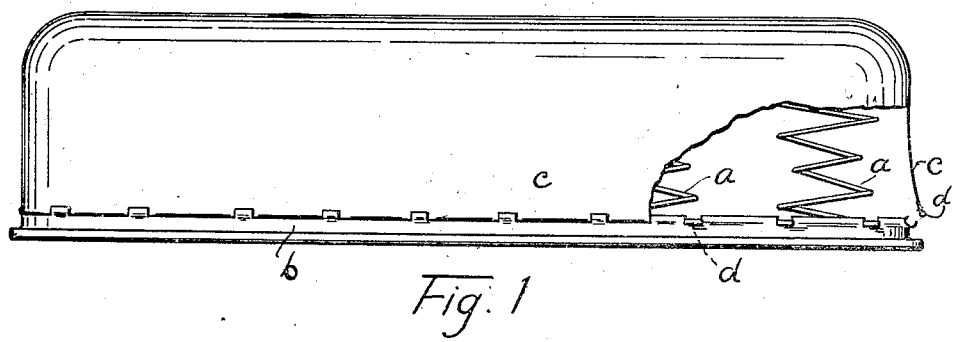
Figure 2:
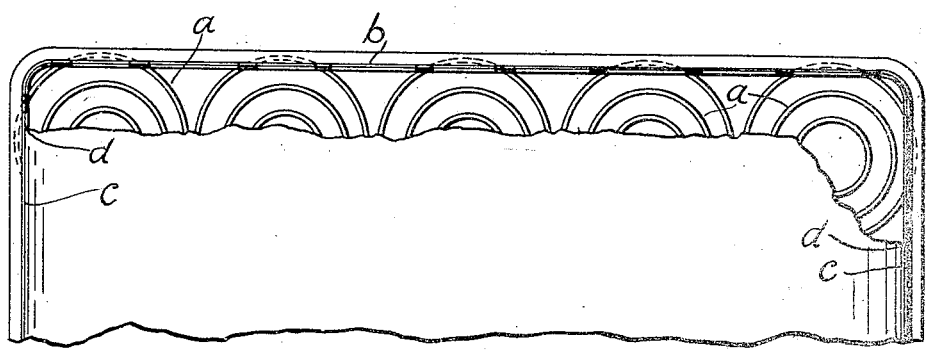

In the drawings, Figure 1 is an end elevation of a seat cushion with part of the upholstering facing broken away to show the springs. Fig. 2 is a fragmentary top view with part of the upholstering broken away to show the springs. Fig. 3 is an enlarged detail of the rim strip taken from the inside. Figs. 4 and 5 are details in section showing how the helical springs and the upholstering facing can be secured to the rim strip.

*a* designates the usual helical springs that are used in seat cushions.

*b* is a rim strip bent to form an inwardly facing channel bar at its bottom so that it can be pinched over the helical springs as shown in Figs. 4 and 5 to securely hold these helical springs at the bottom. The top of the strip is slitted so as to form portions alternately struck out of the plane of the web portion of the strip in alternate directions as shown in Figs. 4 and 5. Preferably these portions are one a short portion, the next a long portion and the third a short portion, etc.; the short portions are bent to the outside of the seat spring and the long portions are bent to the inside. These portions are preferably grooved to receive the welt or cord that runs along the bottom of the upholstering facing *c*. Now referring to Figs. 4 and 5, it will be seen that these upper portions of the rim strip are bent out to receive the lower edge of the upholstering facing which is provided with a welt *d*. This lower edge may be threaded through the space formed by these staggered struck-out portions and then the workman may run along the upper edge of this rim strip with a pair of pliers and bend these struck-out portions over the lower edge of the upholstering facing, and thereby securely tie the upholstering facing to the rim strip. The purpose of the short and long struck-out portions in alternation is that it is only necessary to use the pliers upon the short strips which are struck out to the outside of the seat spring, although if a very secure job is desired, the pliers may be used on all the struck-out and struck-in portions. Now this form of rim strip has several advantages over that form of rim strip shown in the Young patent. In the first place, it saves a certain amount of the upholstering facing which is secured to the top of the rim strip instead of the bottom and bent completely over the bottom as shown in the Young patent.

In the drawings I have shown a very wide rim strip, but it is obvious that the strip could be very much narrower and the struck-out portions almost adjoin the channel bar portions in which the lower coils of the helical springs are pinched. The rim strip, therefore, requires no more metal than the Young strip. A very material advantage over the Young strip is that the helical springs can be rested at the extreme bottom of the seat spring construction so that when the seat cushion is in an automobile the helical springs themselves may rest upon the boards of the seat. This is not true with the Young spring as these helical springs must be held above the seat boards for the reason that it is necessary to have the channel in which the upholstering facing is pinched under the channel in which the lower coils of the helical springs are pinched. The reason for this is apparent. If the S-shaped strip of the Young patent were reversed so as to have the upholstering-pinching channel at the top and the spring-pinching channel at the bottom, then the upholstering would be drawn over the free and sharp edge of one of these channels and consequently this sharp edge would soon wear through the upholstering. Now in my construction the spring-pinching channel is at the extreme bottom and the upholstering-pinching devices are at the extreme top, thereby securing the helical springs at the very bottom of the cushion.

What I claim is:

1. A rim strip for the purpose specified, comprising a strip of metal along whose lower longitudinal edges means is provided for holding the spiral springs of a spring cushion and along whose upper longitudinal edges cross slits are provided forming portions which are alternately struck in and struck out and which may be pinched over the bottom of an upholstering skirt to hold the same in place.

2. A rim strip, comprising a strip of metal whose lower longitudinal edge is bent over to form a channel for holding the spiral springs of the spring cushion and whose upper longitudinal edge is provided with a plurality of cross slits forming along the entire strip portions alternately struck in and struck out, thereby forming a mutilated channel portions of which may be pinched over the bottom edge of an upholstering skirt.

In testimony whereof, I sign this specification.

BERT E. ROCKHOFF.